(12) United States Patent
Rebele et al.

(10) Patent No.: US 11,342,761 B2
(45) Date of Patent: May 24, 2022

(54) BATTERY FLEET CHARGING SYSTEM

(71) Applicant: Pure Watercraft, Inc., Seattle, WA (US)

(72) Inventors: Andrew H. Rebele, Seattle, WA (US); Kerwin Loukusa, Seattle, WA (US); Keith A. Mullins, Seattle, WA (US); Michael V. Schaefer, Port Orchard, WA (US)

(73) Assignee: Pure Watercraft, Inc., Seattle, WA (US)

( * ) Notice: Subject to any disclaimer, the term of this patent is extended or adjusted under 35 U.S.C. 154(b) by 0 days.

(21) Appl. No.: 15/333,082

(22) Filed: Oct. 24, 2016

(65) Prior Publication Data

US 2017/0117723 A1 Apr. 27, 2017

Related U.S. Application Data

(60) Provisional application No. 62/244,774, filed on Oct. 22, 2015.

(51) Int. Cl.
*H02J 7/00* (2006.01)
*H02J 7/06* (2006.01)
(Continued)

(52) U.S. Cl.
CPC ........ *H02J 7/0013* (2013.01); *H02J 7/00036* (2020.01); *H02J 7/00711* (2020.01);
(Continued)

(58) Field of Classification Search
CPC .......... H02J 7/0021; H02J 7/022; H02J 7/045; H02J 7/0004; H02J 7/0013; H02J 7/0027; H02J 7/0072; H02J 2007/0098; H02J 2007/0096; H02J 7/00711; H02J 7/00036; H02J 7/06; H02J 7/0014; H02J 7/0018;
(Continued)

(56) References Cited

U.S. PATENT DOCUMENTS 3,841,396 A 10/1974 Knaebel et al.
4,009,677 A  3/1977 Croisant et al.
(Continued)

FOREIGN PATENT DOCUMENTS

DE 102013218674 3/2015
EP   2372828    10/2011
(Continued)

OTHER PUBLICATIONS

"Compound Planetary Gear," Planetary Gear Train with; Stepped Planet Gear Set—Matlab, http://www.mathworks.com, accessed Aug. 25, 2017, 3 pages.
(Continued)

*Primary Examiner* — Richard Isla
*Assistant Examiner* — Manuel Hernandez
(74) *Attorney, Agent, or Firm* — Perkins Coie LLP (57) ABSTRACT

A battery fleet charging system for charging two or more battery packs simultaneously, at independently controlled charge rates. The present invention can intelligently distribute the available charge power among multiple batteries, either symmetrically or asymmetrically, as specified by a controller that specifies and regulates the charge voltage.

15 Claims, 6 Drawing Sheets

*System Block Diagram*

(51) Int. Cl.
  *B60L 53/62* (2019.01)
  *B60L 53/67* (2019.01)

(52) U.S. Cl.
  CPC ................ *H02J 7/06* (2013.01); *B60L 53/62* (2019.02); *B60L 53/67* (2019.02); *H02J 7/0014* (2013.01); *H02J 7/0018* (2013.01)

(58) Field of Classification Search
  CPC .............. B60L 11/1811; B60L 11/1812; B60L 11/1816; B60L 11/1824; B60L 11/1838; B60L 53/67; B60L 53/62
  USPC .................................................. 320/109, 125
  See application file for complete search history.

(56) References Cited

U.S. PATENT DOCUMENTS

| | | | |
|---|---|---|---|
| 4,092,946 A | 6/1978 | Kappas | |
| 4,099,478 A | 7/1978 | Alexander, Jr. | |
| 4,305,012 A | 12/1981 | Friedel | |
| 4,568,289 A | 2/1986 | Heidrich et al. | |
| 4,849,682 A | 7/1989 | Bauer et al. | |
| 5,296,797 A | 3/1994 | Bartlett | |
| 5,445,545 A | 8/1995 | Draper | |
| 5,539,297 A | 7/1996 | Fiebig | |
| 5,571,023 A | 11/1996 | Anthony | |
| 5,588,853 A | 12/1996 | Anthony | |
| D378,292 S | 3/1997 | Yoshioka | |
| 5,646,506 A * | 7/1997 | Suzuki .................. | H01M 10/44 320/141 |
| 5,744,936 A * | 4/1998 | Kawakami ........ | H01M 10/4207 320/120 |
| 5,808,442 A | 9/1998 | Kaite et al. | |
| 5,967,863 A | 10/1999 | Marchant | |
| 6,231,407 B1 | 5/2001 | Hein et al. | |
| 6,329,796 B1 | 12/2001 | Popescu | |
| 6,865,280 B2 | 3/2005 | Lin | |
| D523,812 S | 6/2006 | Brodin | |
| 7,196,494 B2 | 3/2007 | Baumgartner | |
| 7,270,074 B2 | 9/2007 | Pradetto et al. | |
| D649,938 S | 12/2011 | Erickson et al. | |
| D649,939 S | 12/2011 | Erickson et al. | |
| 8,106,632 B2 | 1/2012 | Delaille et al. | |
| 8,294,420 B2 | 10/2012 | Kocher | |
| 8,643,330 B2 | 2/2014 | Nergaard et al. | |
| 8,658,299 B2 | 2/2014 | Yang et al. | |
| 2004/0130292 A1* | 7/2004 | Buchanan ........... | B60L 11/1811 320/116 |
| 2005/0275372 A1 | 12/2005 | Crowell | |
| 2008/0268333 A1 | 10/2008 | Barrella et al. | |
| 2010/0248562 A1 | 9/2010 | Daikoku | |
| 2011/0263165 A1 | 10/2011 | Rolla | |
| 2011/0291611 A1* | 12/2011 | Manor .................. | H02J 7/0055 320/107 |
| 2012/0074901 A1* | 3/2012 | Mohammed ........ | B60L 11/1842 320/109 |
| 2012/0149516 A1 | 6/2012 | Larrabee et al. | |
| 2012/0153899 A1* | 6/2012 | Marschalkowski ... | H02J 7/0018 320/118 |
| 2012/0282497 A1 | 11/2012 | Yang et al. | |
| 2012/0282825 A1 | 11/2012 | Lin | |
| 2013/0049677 A1* | 2/2013 | Bouman ................. | B60L 1/003 320/106 |
| 2013/0078839 A1 | 3/2013 | Musk et al. | |
| 2013/0229072 A1 | 9/2013 | Matsuda | |
| 2014/0187107 A1 | 7/2014 | Gemin et al. | |
| 2015/0017841 A1 | 1/2015 | Chen | |
| 2015/0077040 A1* | 3/2015 | Longdon ............... | H02J 7/0052 320/107 |
| 2015/0130421 A1 | 5/2015 | Bevilacqua, III | |
| 2015/0318727 A1* | 11/2015 | Vogel ........................ | H02J 7/02 320/107 |
| 2015/0357692 A1 | 12/2015 | Piggott et al. | |
| 2015/0372279 A1* | 12/2015 | Li ......................... | H01M 2/202 429/50 |
| 2016/0111831 A1 | 4/2016 | Kawai et al. | |
| 2016/0114692 A1 | 4/2016 | Tripathi et al. | |
| 2016/0248192 A1 | 8/2016 | Hamada | |
| 2018/0019535 A1 | 1/2018 | Uenosono et al. | |
| 2018/0048091 A1 | 2/2018 | Kawai et al. | |

FOREIGN PATENT DOCUMENTS

| | | |
|---|---|---|
| JP | 2005162055 | 6/2005 |
| WO | WO-2014021841 | 2/2014 |

OTHER PUBLICATIONS

Nitrofreeze "Shrink Fitting," https://web.archive.org/web/20160724183319/http://nitrofreeze.com/services/custom-cryogenic-processing/shrink-fitting/, Jul. 24, 2016, 3 pages.

International Search Report and Written Opinion for International Patent Application No. PCT/US2017/026852, Applicant: Pure Watercraft, Inc., dated Jun. 19, 2017, 11 pages.

Extended European Search Report and Written Opinion for European Patent No. 17905750.0, Applicant: Pure Watercraft, Inc., dated Oct. 22, 2020, 9 pages.

* cited by examiner

*Fig. 1*
*Fleet Charging System Logic Flow Chart*

*Fig. 2*
System Block Diagram

Fig. 3
*Charging Architecture Schematic*

Fig. 4
*Detailed Charge Switching Circuit*

*Fig. 5*
*Detailed Isolation Circuit*

Fig. 6
*Diode OR Circuit*

BATTERY FLEET CHARGING SYSTEM

PRIORITY

The present invention claims the benefit of U.S. Provisional application 62/244,774 filed on Oct. 22, 2015.

FIELD OF THE INVENTION

The present invention is a battery fleet charging system for simultaneously charging two or more batteries.

BACKGROUND OF THE INVENTION

Existing charging systems are designed to charge a single battery or battery pack, usually at a constant charge rate. If there are multiple battery packs that need to be charged, there either need to be multiple charging systems available or the battery packs must be charged one at a time, even if there is excess charge power available.

U.S. Pat. No. 8,643,330 teaches a method of operating a multiport vehicle charging system (Tesla Motors, Inc.) and accomplishes a similar goal, regulating DC charge to multiple EVs, but goes about it in a different way. Patent '330 uses multiple AC-to-DC power stages coupled to a series of switches that in aggregate control the charge rate of one or more DC output channels. The charge rate is varied to the different channels by closing some switches and opening others to redirect the output from the AC-to-DC power stages.

In contrast, the present invention uses a single AC-to-DC power stage that feeds into separate transistor switching circuits for each channel. Each separate switching circuit can control the charge rate to its channel independently of the other channels. A central controller manages the total available power to all channels so that the sum of the charge rates at each channel adds up to the total available charge rate (or in some cases will be less than the total available charge rate if limited by the battery max charge rate).

U.S. Pat. No. 8,106,632 teaches a method for managing a bank of rechargeable batteries using the coup de fouet effect on charging and describes a preferential charging method for a bank of rechargeable batteries.

U.S. Pat. No. 5,808,442 teaches a method of charging a plurality of lithium ion rechargeable batteries and discusses the ability to attach additional batteries during battery charging. However, it deviates from the present invention by giving priority to batteries with higher open cell voltage.

U.S. Pat. No. 5,539,297 discuses a charging device for charging a plurality of batteries based on parameter priority. In contrast, the present invention gives priority to batteries with lower voltage. When the voltage equalizes with the rest of the batteries it begins charging the rest simultaneously.

U.S. Pat. No. 8,294,420 discusses a kiosk vehicle charging and selecting system for the batteries of one or more electric vehicles in the most efficient and economical method based on a variety of factors such as battery condition and energy cost.

U.S. Pat. No. 7,196,494 discloses a method and apparatus for charging batteries in a system of batteries. This invention surveys a group of batteries that are connected to the charger to determine the battery with the lowest state of charge. It then charges the battery with the lowest state of charge for a finite amount of time until there is a new lowest state of charge battery. The charger then switches over to charge the next battery with lowest state of charge. It does not continue to charge the original battery simultaneously, unlike the present invention.

U.S. Pat. No. 4,849,682 teaches a battery-charging system for charging a plurality of batteries by prioritizing the charging of the batteries from most to least fully charged. Charging is provided by a pulsed current that charges the batteries in a short period of time and utilizes the charger at full or near full capacity.

U.S. patent application Ser. No. 13/290,396 teaches a method and charging device for charging at least two batteries. This invention is used to charge two or more batteries, starting with the battery with the lowest charge status. However, charging occurs sequentially as opposed to simultaneously.

The present invention overcomes the above limitations by allowing multiple battery packs to be charged simultaneously, at independently controlled charge rates. The present invention can intelligently distribute the available charge power among multiple batteries, either symmetrically or asymmetrically, as specified by a controller that specifies and regulates the charge current and voltage.

Furthermore, multiple battery packs connected in parallel can be charged on a single channel at the same charge voltage.

SUMMARY OF THE INVENTION

Specifically, the present invention provides a battery fleet charging system for simultaneously charging two or more batteries at independently controlled charge rates and intelligently distributing available charge power among the two or more batteries up to a battery max charge rate, either symmetrically or asymmetrically, as specified by a central controller that specifies and regulates a charge voltage comprising: two or more batteries; a single AC-to-DC power stage that feeds into at least one separate transistor switching circuit for one or more output channels, wherein each separate switching circuit can control a charge rate to a first output channel independently of a second output channel, and wherein the one or more output channels are connected to the two or more batteries; and a central controller managing the available power to the one or more output channels so that a sum of charge rates at each output channel adds up to the available charge rate up to the battery max charge rate.

The present invention also provides a method of simultaneously charging two or more batteries in a battery fleet charging system at independently controlled charge rates and intelligently distributing available charge power among the two or more batteries up to a battery max charge rate, either symmetrically or asymmetrically, as specified by a central controller that specifies and regulates a charge voltage comprising the steps of:

a) monitoring conditions of the two or more batteries;

b) drawing AC power from a power grid and converting it into DC power;

c) supplying the DC power into at least one separate transistor switching circuit for one or more output channels wherein each of the one or more outputs channels contain one or more electrically controlled switches and is connected to the two or more batteries; and d) managing the available power to the one or more output channels with a central controller so that a sum of charge rates at each output channel adds up to the available charge rate up to the battery max charge rate.

BRIEF DESCRIPTION OF THE DRAWINGS

FIG. 1 describes the logical flow of system operation of the present invention beginning with system power on.

DETAILED DESCRIPTION OF THE INVENTION

The battery fleet charging system of the present invention is an electrical device that can be used to charge multiple batteries simultaneously. The device draws AC power from the grid and converts it into DC power that is then supplied to one or more output channels, each channel being connected to two or more batteries.

Each output channel contains a switching circuit consisting of one or more electrically controlled switches, for example an insulated gate bipolar transistor (IGBT). A controller is used to turn the switches on and off rapidly to vary the output voltage at each channel, and hence the charge current. This process, known as pulse width modulation (PWM), is part of a closed-loop control system whereby the battery pack voltage and current are monitored in real time and communicated back to the controller, which makes adjustments to the PWM to match the charge current or charge voltage set point. The charge voltage set point for each channel can be independently specified, such that battery packs on different channels can be charged at different rates simultaneously, as specified by the user or as hard coded into the charging system firmware.

The present invention has been designed with sophisticated safety protocols to ensure safety of the user, the batteries being charged, and the charging system itself. As shown in the figures, each charging channel requires communication between the battery and charger, and certain conditions must be satisfied before charging will be initiated. Once all conditions have been satisfied, the charging system sends a request to the battery to close an internal electrically controlled switch (contactor), which establishes an electrically conductive path between the energy storage devices within the battery pack and the external connectors. Likewise, the charging system closes its own internal electrically controlled switch to enable power to the external connectors. Furthermore, if communication between the charging system and battery indicates an unsafe condition, or if communication is lost, the electrically controlled switches revert to the open condition to halt charging. This safety protocol also eliminates the risk of electrical shock at the external connectors when not mated.

The communications that must take place between the charger and battery can use any method for data exchange. The present invention describes an embodiment that uses wired communication, however, wireless communication can also be used. On each channel, communications are transmitted over a bus. This enables multiple battery packs to be connected to the same channel, in a parallel arrangement. The charging system can identify each separate battery pack connected to the charging channel and communicate with each independently.

Figure 1:
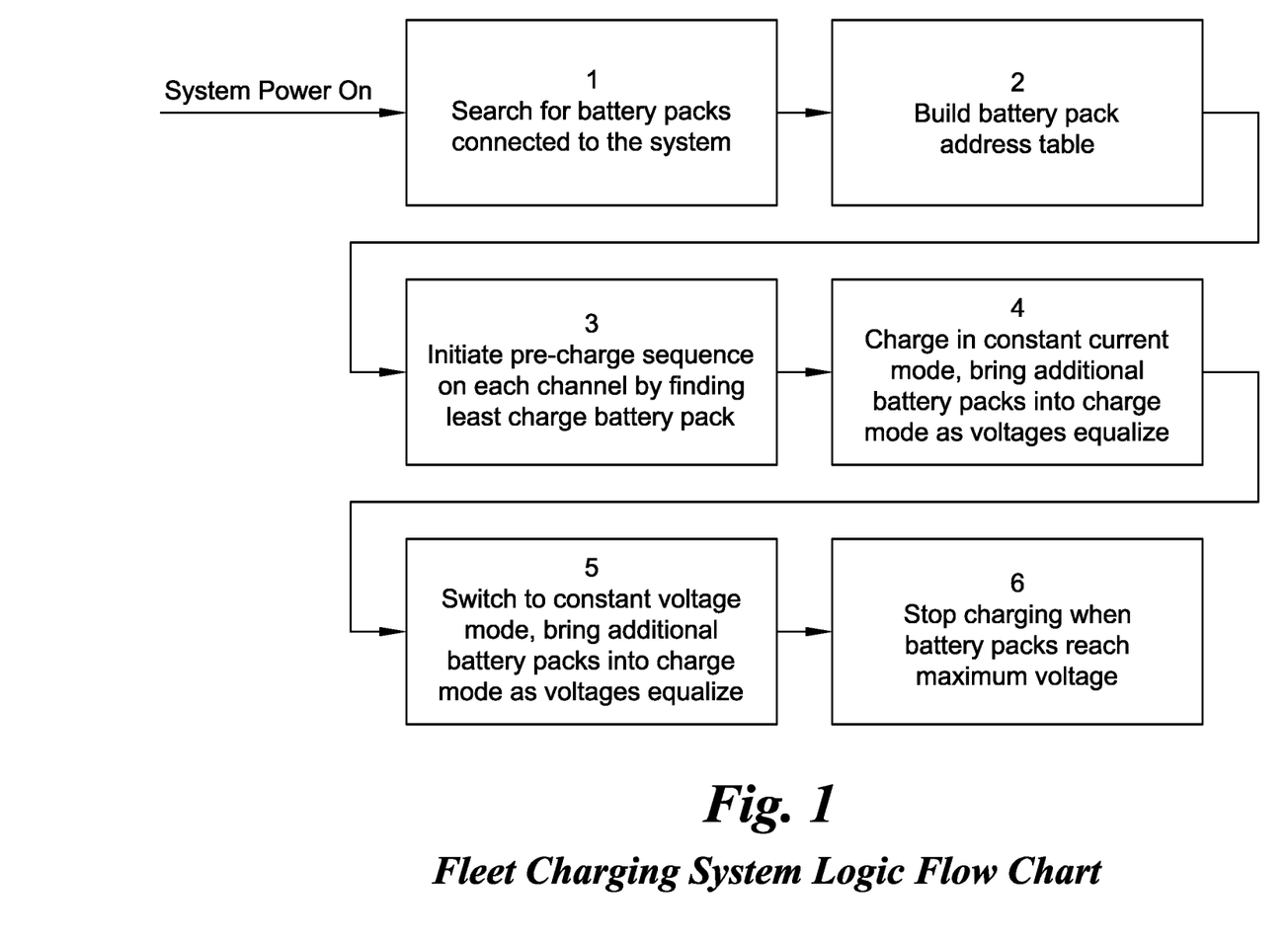

FIG. 1 describes the logical flow of system operation, beginning with system power on. Not shown is the capability to physically add additional battery packs into the system while the system is operating.

Figure 2:
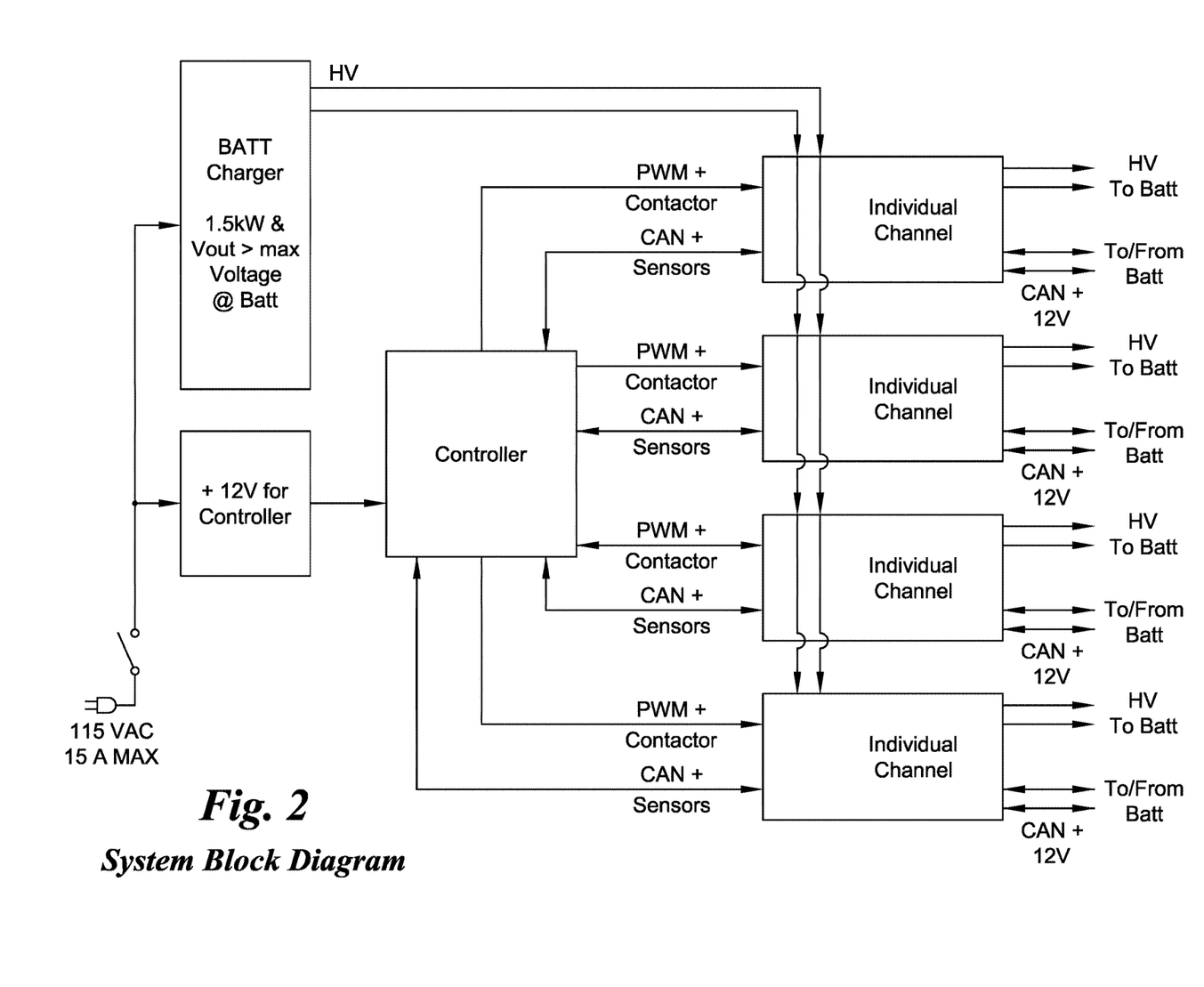
FIG. 2 depicts a system block diagram that describes the major components of the present invention and their connectivity.

FIG. 2 depicts a system block diagram that describes the major components and their connectivity. This illustration depicts four charging channels, but the number of channels is only limited by the choice of controller(s).

Figure 3:
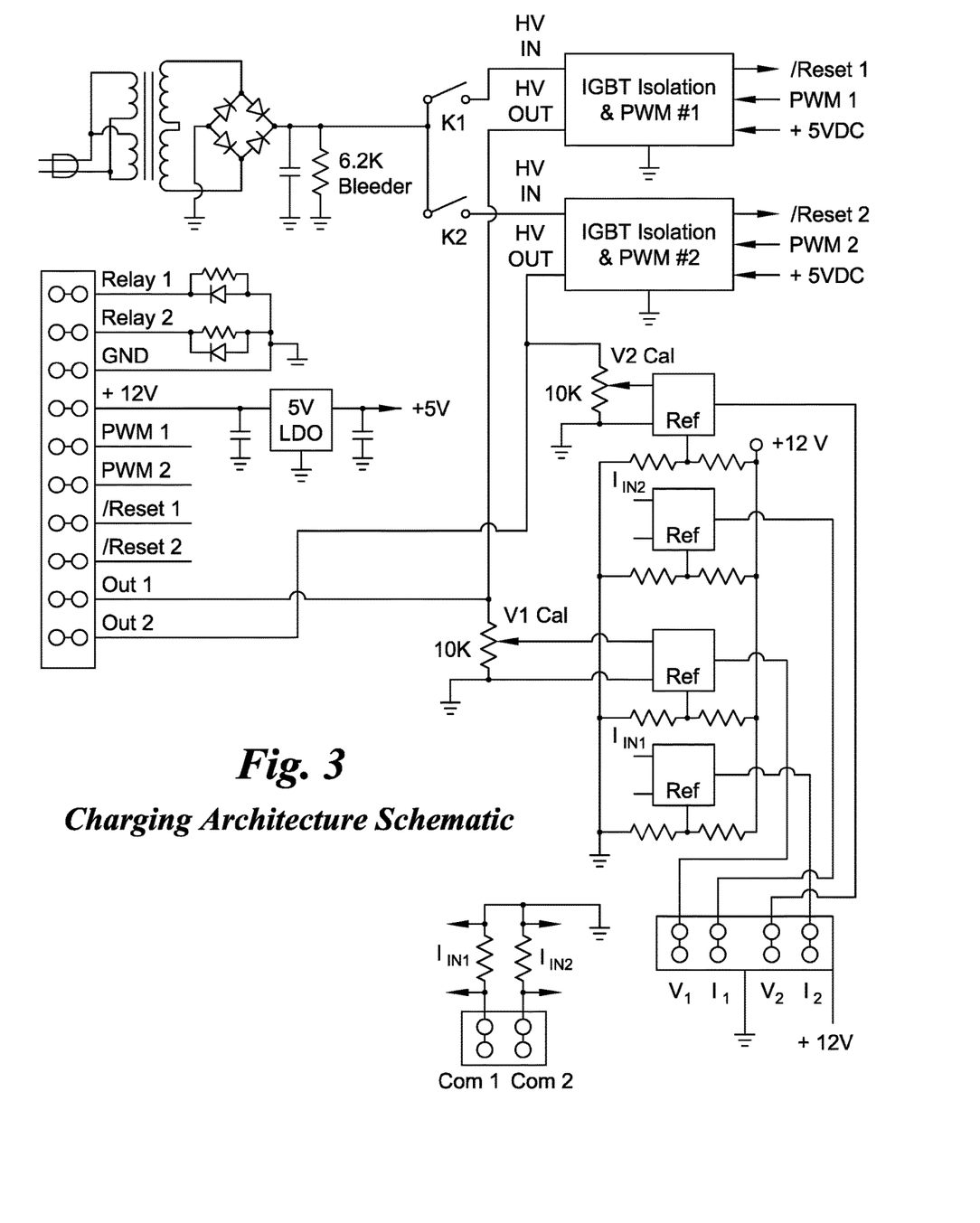
FIG. 3 depicts a more detailed architecture schematic for the charging system of the present invention with select components identified by type.

FIG. 3 depicts a more detailed architecture schematic for the charging system, with select components identified by type. This illustration depicts only two charging channels, but the number of channels is only limited by the choice of controller(s).

Figure 4:
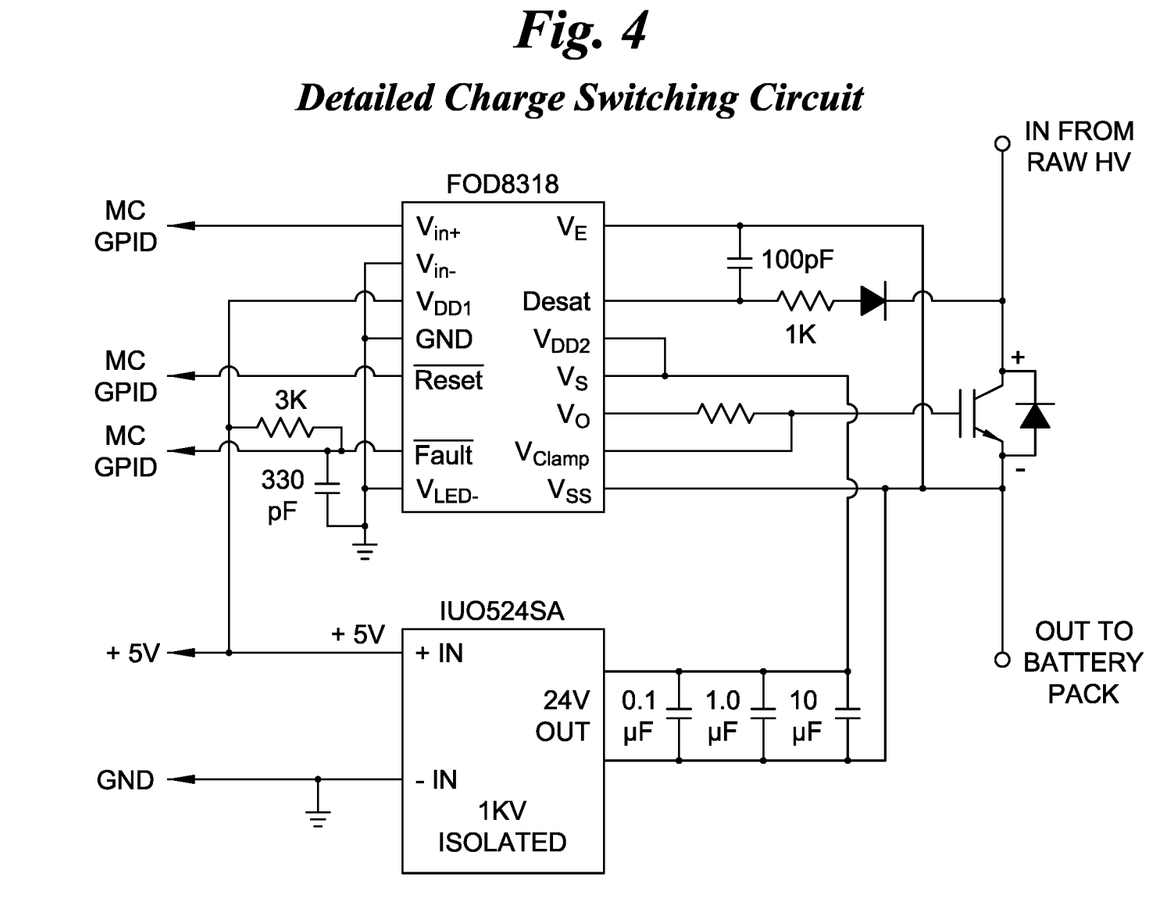
FIG. 4 depicts a detailed schematic of the switching circuitry used for each charging channel of the present invention.

FIG. 4 depicts a detailed schematic of the switching circuitry used for each charging channel.

Figure 5:
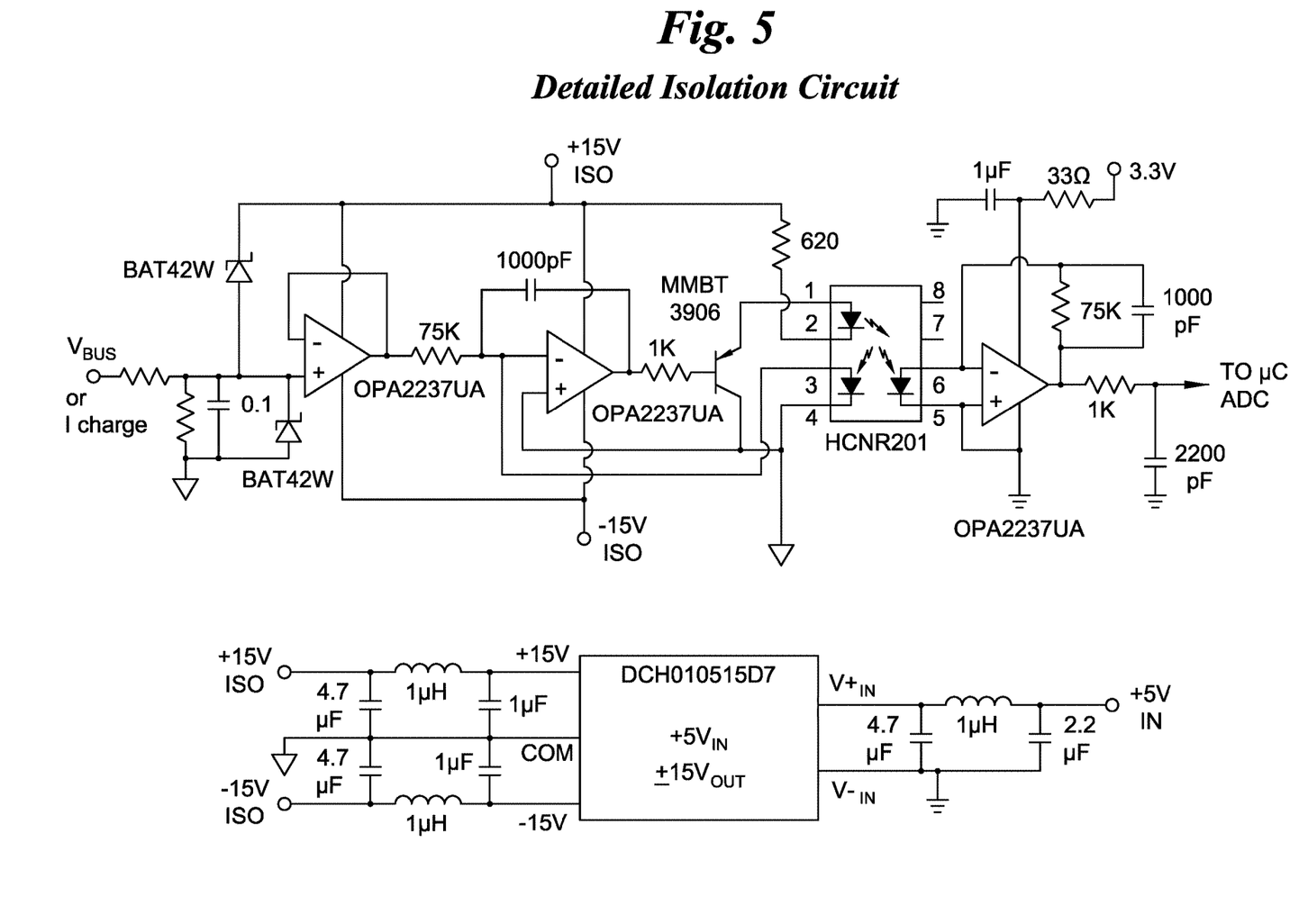
FIG. 5 depicts a detailed schematic of the isolation circuits in the present invention.

FIG. 5 depicts a detailed schematic of the isolation circuits.

A battery pack voltage varies depending on its state of charge. For example, the voltage will be higher when the battery pack is fully charged than when it is fully discharged. This presents a problem for connecting battery packs in parallel that may be at different states of charge. Current will flow from the battery pack with higher voltage to the battery pack with lower voltage, possibly at an exceedingly high rate due to the low internal resistance of the battery pack. The present invention handles this potential issue by requesting the voltage of each battery pack connected to the channel prior to closing the charge circuit. By having independent control of each battery packs contactors, the charger can charge the battery pack(s) with the lowest voltage first, then connect additional packs as the voltage of the charging packs is brought up to the same level.

The electronics of the charging system also performs safety checks continuously during operation to monitor for dangerous conditions that may be present in the system. If dangerous conditions are noted they are logged and the appropriate action is taken to prevent a harmful situation being presented to the user.

Figure 6:
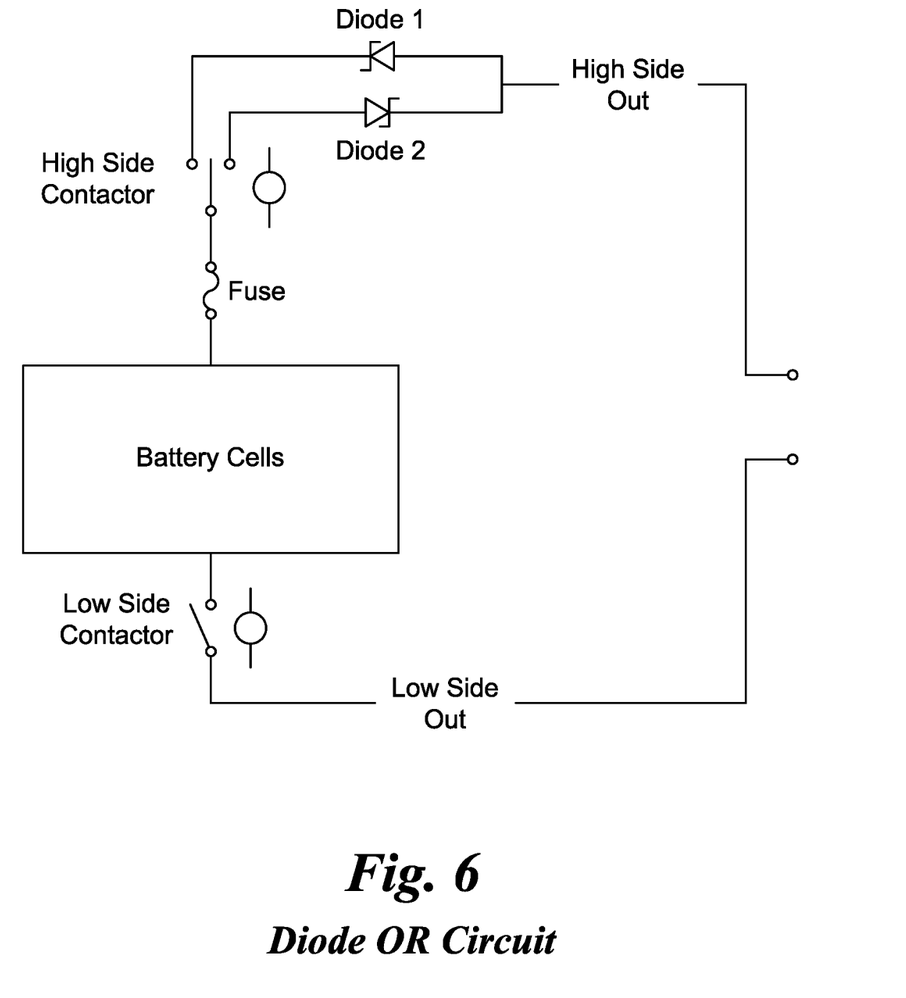
FIG. 6 illustrates an alternative arrangement on the battery pack using the present invention.

The present invention also includes an alternative method to address the challenges described in the previous paragraphs. FIG. 6 illustrates an alternative arrangement on the battery pack. The addition of two diodes on the positive terminal of the battery pack, along with a single pole double throw (SPDT) switch can be used to prevent current flow between battery packs at different voltages. For example, during discharge the SPDT switch is connected to Diode 2, which allows current to flow out of the battery pack when the voltage of the battery cells is greater than the voltage at the high side terminal, but prevents current flow in the opposite direction when the voltage at the high side terminal is greater than the voltage of the battery cells. Similarly, during charging the SPDT switch is connected to Diode 1, which allows current to flow into the battery pack when the voltage at the high side terminal is greater than the voltage of the battery cells, but prevents current flow in the opposite direction when the voltage of the battery cells is greater than the voltage at the high side terminal.

An additional safety feature is that the default switch location is connected to Diode 1 (i.e., when the battery pack is not in use), which ensures that no current can flow from the battery pack terminals. This is a redundant safety feature since there is typically another switch (Low Side Contactor in FIG. 6) whose default position is OPEN, also preventing current flow from the battery pack terminals when not in use.

There are additional benefits to having independent control of battery pack contactors. For example, if one battery pack indicates a fault the charger can request that its contactor be opened, which suspends charging to that battery pack while continuing to charge other battery packs connected to the same channel. This capability also allows additional battery packs to be connected to a currently live channel at any time, regardless of their voltage, and the charger will evaluate its state of charge and take action to equalize its voltage with the other battery packs.

Potential uses for this invention include applications where multiple batteries need to be recharged simultaneously. This may include all types of electric vehicle charging, battery powered consumer electronics, battery powered tools, etc. The invention provides the most value to organizations that operate a fleet of battery-powered items.

While the present invention has been described with particular embodiments, it should be clear to one skilled in the art that additional embodiments are contemplated without departing from the intended scope and coverage of the disclosure. The scope of the invention is further described in the following claims.

We claim:

1. A battery fleet charging system for simultaneously charging two or more batteries based on distributing available charge power, the system comprising:
    a single AC-to-DC power stage to convert AC power to available DC power;
    a first output channel including a first switch having a first source-side terminal and a first load-side terminal, the first output channel being removably coupleable to a first battery of the battery fleet to recharge the first battery, wherein the first battery is configured to provide at least 10V for powering electric vehicles, wherein:
        the first source-side terminal is operably coupled to the single AC-to-DC power stage to feed the available DC power or a portion thereof through the first switch at a first output voltage for charging the first battery electrically connected to the first load-side terminal, and
        the first switch is connected in series between the AC-to-DC power stage and a first terminal configured to connect to the first battery, and
        the first switch is an insulated gate bipolar transistor (IGBT) and is the only switch that controls the first output voltage in an electrical path connecting the AC-to-DC power stage to the first terminal;
    a second output channel including a second switch having a second source-side terminal and a second load-side terminal, the second output channel being removably coupleable to a second battery of the battery fleet to recharge the second battery, wherein the second battery is configured to provide at least 10V for powering electric vehicles, wherein:
        the second source-side terminal is operably coupled to the single AC-to-DC power stage to feed the available DC power or a portion thereof through the second switch at a second output voltage for charging the second battery electrically connected to the second load-side terminal,
        the second switch is connected in series between the AC-to-DC power stage and a second terminal configured to connect to the second battery,
        the second switch is an IGBT and is the only switch that controls the second output voltage in an electrical path connecting the AC-to-DC power stage to the second terminal;
    a central controller operably coupled to the first and second output channels to manage the available DC power supplied through the first and second output channels for simultaneously charging the first and second batteries at independent rates, wherein the central controller is configured to control the first and second output voltages by operating the first and second switches, respectively, based on adjusting pulse width modulation to match a corresponding charge current set point or a corresponding charge voltage set point, wherein the charge voltage set points for the first and second output channels are independent of each other;
    two diodes connected to the first load-side terminal, wherein the two diodes are connected in parallel to each other and have opposite orientations; and
    a single pole double throw (SPDT) switch coupled to the two diodes to connect the first battery, wherein the SPDT switch connects one of the two diodes to the first battery to prevent current flow in a direction opposing the charging or discharging direction.

2. The battery fleet charging system of claim 1, wherein the central controller is configured to:
    control a first charge rate based on controlling the first output voltage, wherein the first charge rate is for charging the first battery; and
    control a second charge rate based on controlling the second output voltage, wherein the second charge rate is for charging the second battery and is independent of the first charge rate.

3. The battery fleet charging system of claim 1, wherein the central controller is configured to repeatedly turn the first and second switches on and off to implement the pulse width modulation to vary an output voltage, a charge current, or a combination thereof at the first terminal and/or the second terminal.

4. The battery fleet charging system of claim 3, wherein:
    the charging system is part of a closed-loop control system that further comprises a feedback loop to provide the output voltage, the charge current, or both in real time to the central controller;
    the central controller is configured to adjust the pulse width modulation based on the fed back values of the output voltage and/or the charge current to match the charge voltage set point.

5. The battery fleet charging system of claim 4, wherein the central controller is configured to:
    determine a first condition of the first battery;
    determine a first charge voltage set point for the first output channel based on the first condition;
    determine a second condition of the second battery;
    determine a second charge voltage set point for the second output channel based on the second condition;
    wherein the charge voltage set point for each output channel can be independently specified for simultaneously charging the first battery and the second battery at different rates.

6. The battery fleet charging system of claim 5, further comprising
    firmware;

wherein:
the charge voltage set points are hard coded into the firmware.

7. The battery fleet charging system of claim 1, wherein the central controller is configured to implement a communication protocol for communicating with the first battery, the second battery, or a combination thereof using any established wired or wireless method of data exchange.

8. The battery fleet charging system of claim 1, wherein the central controller controls the first and second voltage outputs to equalize voltage levels of the first and second batteries.

9. A method of simultaneously charging two or more batteries, the method comprising:
monitoring conditions of a first connected battery and a second connected battery, wherein the first and second connected batteries are each configured to provide at least 10V for powering electric vehicles;
converting AC power into available DC power;
supplying the available DC power into a first output channel including a first switch and a second output channel including a second switch, wherein:
the first and second output channels are removably coupleable to the first and second batteries, respectively,
the first switch is connected in series between the AC-to-DC power stage and a first terminal configured to connect to the first battery, wherein the first switch is an insulated gate bipolar transistor (IGBT) and is the only switch that controls a first output voltage in an electrical path connecting the AC-to-DC power stage to the first terminal,
the second switch is connected in series between the AC-to-DC power stage and a second terminal configured to connect to the second battery, wherein the second switch is an IGBT and is the only switch that controls a second output voltage in an electrical path connecting the AC-to-DC power stage to the second terminal;
managing the available DC power to the one or more output channels with a central controller by controlling the first switch to provide the first output voltage and the second switch to provide the second output voltage that is independent of the first output voltage, wherein the first and second switches are controlled concurrently and based on adjusting pulse width modulation to match corresponding charge voltage set points,
wherein the charge voltage set points for the first and second output channels are independent of each other; and
operating a single pole double throw (SPDT) switch, which is coupled to two diodes that are connected in parallel to each other and to the first load-side terminal, to connect the first battery, wherein operating the SPDT switch includes connecting one of the two diodes to the first battery to prevent current flow in a direction opposing the charging or discharging direction.

10. The method of claim 9, further comprising using the pulse width modulation with the central controller turning the first and second switches on and off repeatedly to vary the first and second output voltages, first and second charge currents, or a combination thereof at the first and second terminals.

11. The method of claim 10, further comprising:
monitoring the output voltages, the first and second charge currents, or a combination thereof in real time; and
communicating the monitored output voltages, the first and second charge currents, or a combination thereof back to the central controller; and
wherein:
managing the available DC power includes managing the available DC power by using the central controller to adjust the pulse width modulation to match the first and second charge currents, the output voltages or a combination thereof to corresponding set points.

12. The method of claim 9, further comprising requesting voltage conditions of the first and second batteries prior to closing a charge circuit.

13. The method of claim 9, further comprising continuously performing safety checks including requiring communication in each charging channel between the corresponding connected battery and the central controller and requiring that predetermined conditions are met before charging is initiated.

14. The method of claim 13, further comprising sending a request to the first and second batteries to close an internal electrically controlled switch or contactor once the predetermined conditions are met, thereby establishing an electrically conductive path between the energy storage devices with the battery and the external connectors.

15. The method of claim 9, further comprising communicating between the central controller and the first and second batteries using any established method of wired or wireless data exchange.

* * * * *